UNITED STATES PATENT OFFICE.

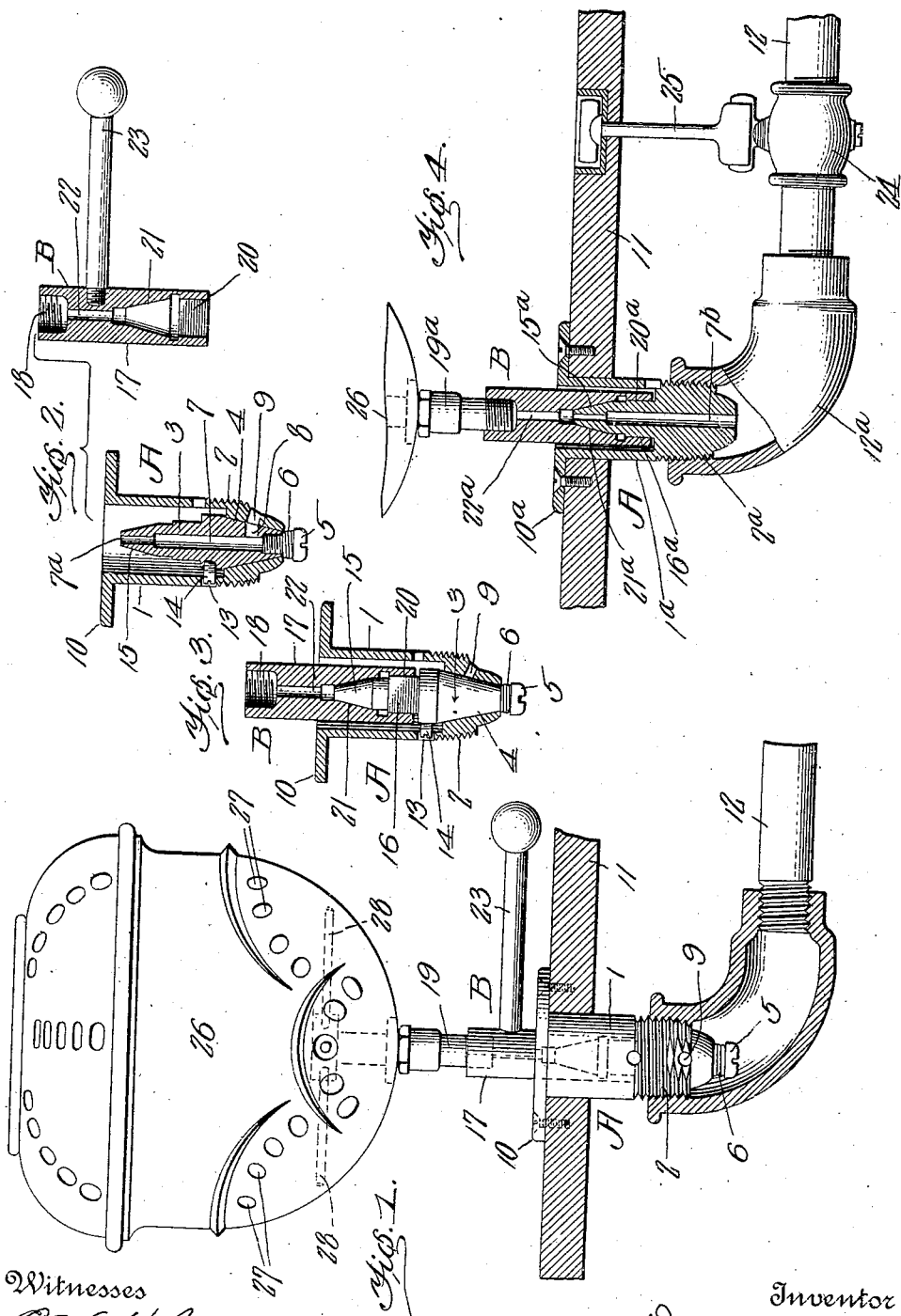

DONALD McDONALD, OF LOUISVILLE, KENTUCKY.

COUPLING.

No. 876,484.   Specification of Letters Patent.   Patented Jan. 14, 1908.

Application filed May 15, 1906. Serial No. 317,003.

*To all whom it may concern:*

Be it known that I, DONALD McDONALD, a citizen of the United States, and a resident of Louisville, in the county of Jefferson and State of Kentucky, have invented certain new and useful Improvements in Couplings, of which the following is a specification.

This invention relates to couplings, and more particularly to couplings for connecting gas stoves to their supply pipes.

Heretofore to connect gas stoves to gas supply pipes, either a flexible rubber tubing or a fixed piping has been employed. The first of these provides a detachable connection but it is unsightly and soon becomes leaky. The other not only is unsightly, but it requires a skilled person to connect and disconnect the stove.

An object of my invention is to provide a coupling which will permit the stove to be quickly coupled to and uncoupled from the supply pipe by an unskilled person.

Still another object is to construct the coupling so that it may be positioned in an out of the way place and thus not be in the way when the stove is not in use.

Other and further objects will appear in the following description and will be more particularly pointed out in the appended claims.

In the drawings:—Figure 1 is a side elevation of the coupling with a stove connected thereto, the elbow of the supply pipe being in section; Fig. 2 are sectional views of the two parts of the coupling; Fig. 3 is a view showing the casing of one member of the coupling in section and the interior portion in elevation; and Fig. 4 is another embodiment of my invention.

The coupling comprises two members A and B having interfitting connection.

In the embodiment shown in Figs. 1 to 3, the member A is formed of a casing 1 exteriorly threaded at 2 at one end and provided with an annular attaching portion or flange 10 at the other end. The casing is fitted through the floor or the wall 11 of a room with the flange fitting against one face thereof, the other or screw-threaded end being connected to a supply pipe 12. The casing is bored throughout its length to provide a duct, the greater portion of the bore being cylindrical, and the portion at the screw threaded end being tapered. Within the bore of the casing 1 is fitted a manually operated turning plug 3 which is formed tapered at 4 to fit within the tapered portion of the casing bore, the plug being yieldingly held within the tapered portion of the casing bore by means of a headed screw 5 which enters a threaded walled opening in one end of the plug, and a helical spring 6 which surrounds the screw 5 and engages the casing 1 at one end and the head of the screw at the other end. The plug 3 is provided with a bore or duct 7 which extends in the direction of the turning axis, from the tapered end to the other end, where it is reduced in diameter at $7^a$. The plug is also provided with a lateral bore 8 which is adapted to be alined with a lateral bore or opening 9 in the casing 1, thus providing a valved plug turning in its seat within the casing 1.

The rotation of the plug is limited by the following means. The casing is provided with a slot 13 into which projects a pin 14 on the plug 3. The slot also serves as an exit for any dirt which might collect within the casing. So that the coupling member A may be easily connected to the coupling member B, the turning plug is formed with an upwardly projecting member having a tapered portion 15, and a non-circular portion 16.

The member B is formed of a rotating part 17 secured by threads 18 to a nipple or pipe 19 connected with the gas stove. The rotating part 17 is provided with a large non-circular bore 20 to fit the like portion 16 of member A, a tapered bore 21 to fit the tapered portion 15 of member A, and a gas duct 22 of greater diameter than the duct or bore $7^a$, so that the gas discharged from the latter duct will not be retarded and thus leak from the coupling. It serves, moreover, as a readily removable knock-down supporting column whereby the supply pipe is adapted to receive and support the gas stove. The rotating part 17 is also provided with a handle 23, which when the members A and B are coupled together, causes the turning plug to take the position of the rotating member 17 and thus open or close the valve of the member A.

In the embodiment shown in Fig. 4, the member A comprises a casing $1^a$ formed with a flange $10^a$ at one end and external threads $2^a$ at the other end to connect with the supply pipe $12^a$. The casing is provided with a large bore having a projecting member located therein and formed with a tapered portion $15^a$ and a non-circular portion $16^a$. A bore $7^b$ extends longitudinally through the casing and through the projecting member. The member B in this embodiment has a screw threaded connection with the nipple 19ª but it does not rotate. It is also provided with a duct 22ª, with a tapered bore 21ª and with an enlarged bore 20ª. Instead of providing a valve within the member B, as in the other embodiment, the gas in the supply is controlled by a turning plug 24 which in turn is controlled by a rod 25 extending through the wall or floor adjacent the coupling member A.

In both embodiments, the gas stove may be of any suitable form. In the drawings, I have illustrated a cup shaped body 26 formed at its top to receive a cooking vessel and provided with a series of air openings 27. Within the body is located a burner 28 formed of perforated radial arms and connected to the nipple 19. The projecting member within the casing enters the member B and forms a loose connection which prevents the escape of gas but permits the almost instantaneous removal of the gas stove.

Having thus described my invention, what I claim and desire to secure by Letters Patent is:

1. The combination with a gas stove and the supply pipe therefor, of a valved coupling comprising a casing member connected with the supply pipe and provided with a flange by means of which it is supported, a valved plug rotatable in said casing member, and a rotating part provided with a bore; said valved coupling being adapted to support said stove.

2. The combination with the gas stove and a supply pipe, of a coupling member secured to the gas stove, a coupling member connected with the supply pipe adapted by the first mentioned coupling member, to support the stove and comprising a casing which is provided at one end with an attaching flange, and a projecting member within the casing having a longitudinal duct and a tapered outer wall, and projecting into the coupling member secured to the stove.

3. The combination with a gas stove and a supply pipe, of a coupling between said parts comprising two members, one of which is secured to the supply pipe and provided with a valved plug and the other of which is detachably mounted on said valved plug and adapted to support the stove.

4. The combination with the gas stove and the supply pipe, of a coupling member connected with the supply pipe for supporting the stove and provided at one end with a flanged portion, a turning plug provided with ducts, within the coupling member, and a second coupling member adapted to seat upon said turning plug to support the stove, and comprising a rotatable portion formed to engage the turning plug and a handle for turning the same.

5. The combination with a gas stove and a supply pipe of a coupling member for mounting the stove above the supply pipe, a valve within said coupling member for controlling the flow of gas therethrough, a flange at one end of the coupling whereby the same is rigidly attached to the floor, and a second coupling member comprising in a single member, a stove support, a coupling member and a valve operating handle.

6. The combination with the gas stove of a supply pipe therefor, a valved member carried by the end of said supply pipe and provided with means for rigidly securing the same to the floor, and a rotating member seated in said valved member and adapted to receive and support the stove while controlling the flow of gas thereto from the supply pipe.

7. The combination with a gas supply pipe, of a valve provided with a flanged casing, connected to the extremity thereof whereby the supply pipe and valve are rigidly secured to the floor of a room without projecting above the surface of the floor; a rotatable member removably seated upon said valve and provided with means for operating the same; and a gas stove adapted to be mounted above the valved casing by means of said removable and rotatable member in such manner as to afford an unobstructed floor space upon its removal from the supply pipe.

8. The combination with a gas stove and a supply pipe therefor; of a coupling between said parts upon which the stove is mounted above the supply pipe, said coupling comprising two members, one of which is secured to the supply pipe and is provided with a valve and the other of which is connected to the stove and is provided with manually operated means to control the position of the valve.

9. The combination with a gas stove and a supply pipe therefor; of a coupling upon which the stove is mounted above said supply pipe, said coupling comprising two members one of which is secured to the supply pipe, and has a turning plug and the other of which is connected to the stove and is provided with means to control the position of the turning plug.

10. The combination of a gas stove, a supply pipe therefor and a separable coupling between said parts comprising a valve, said separable coupling being adapted to support the gas stove.

11. The combination with a gas stove and a supply pipe therefor, of a coupling member secured to the supply pipe in such manner as to support the stove above the supply pipe, and comprising a casing provided with an opening, an attaching flange on one end of the casing, a turning plug mounted within the casing and controlling said opening, and a projection on the turning plug by which the plug is controlled, provided with a duct to communicate with the opening in the casing; and a coupling member connected to the stove and engaging the projection on the pipe-carried coupling member to turn the plug.

12. The combination with a gas stove and a supply pipe therefor, above which said stove is mounted; of a separable coupling between said parts, comprising a valve, a member connected to the gas stove, a member connected to the supply pipe, and means residing in said coupling whereby it is adapted to support the gas stove above the supply pipe.

The foregoing specification signed at Louisville, Ky.

DONALD McDONALD.

In presence of two witnesses—
 OSCAR FISCHER,
 WM. H. CINTCHER.